(12) United States Patent
Ghosh et al.

(10) Patent No.: US 10,284,429 B1
(45) Date of Patent: May 7, 2019

(54) SYSTEM AND METHOD FOR SHARING SUBSCRIBER RESOURCES IN A NETWORK ENVIRONMENT

(71) Applicant: Cisco Technology, Inc., San Jose, CA (US)

(72) Inventors: Ameo Ghosh, Pune (IN); Anurag Chaturvedi, Pune (IN); Vimal Srivastava, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/058,125

(22) Filed: Aug. 8, 2018

(51) Int. Cl.
*H04L 12/24* (2006.01)
*H04W 76/10* (2018.01)

(52) U.S. Cl.
CPC ...... *H04L 41/0893* (2013.01); *H04L 41/5003* (2013.01); *H04W 76/10* (2018.02)

(58) Field of Classification Search
CPC . H04L 41/0893; H04L 41/5003; H04W 76/10
See application file for complete search history.

(56) References Cited

U.S. PATENT DOCUMENTS

| | | | |
|---|---|---|---|
| 4,236,068 A | 11/1980 | Walton | |
| 5,642,303 A | 6/1997 | Small et al. | |
| 5,751,223 A | 5/1998 | Turner | |
| 6,812,824 B1 | 11/2004 | Goldinger et al. | |
| D552,603 S | 10/2007 | Tierney | |
| 7,573,862 B2 | 8/2009 | Chambers et al. | |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |

(Continued)

FOREIGN PATENT DOCUMENTS

| | | |
|---|---|---|
| WO | WO 2013/020126 | 2/2013 |
| WO | WO 2014/098556 | 6/2014 |

(Continued)

OTHER PUBLICATIONS

Cox et al., "Advancing Software-Defined Networks: A Survey," IEEE, Oct. 12, 2017, pp. 1-40.

(Continued)

*Primary Examiner* — Ian N Moore
*Assistant Examiner* — Justin T Van Roie
(74) *Attorney, Agent, or Firm* — Polsinelli PC (57) ABSTRACT

Systems, methods, and computer-readable media are provided for modifying a network service of a requesting network member. A request, received from the requesting member, can include an identification of a sponsoring network member for a requested network service modification. A group can be generated and associated with the requesting member and with the sponsoring member. The group may also include a group policy referencing the requested network service modification. The sponsoring member can be provided with an activation key for activating the network service modification and a first network policy can be applied to the requesting member and a second network policy can be applied to the sponsoring member.

15 Claims, 6 Drawing Sheets

(56) References Cited

U.S. PATENT DOCUMENTS

| | | | |
|---|---|---|---|
| 8,300,594 | B1 | 10/2012 | Bernier et al. |
| 8,325,626 | B2 | 12/2012 | Tóth et al. |
| 8,396,485 | B2 | 3/2013 | Grainger et al. |
| 8,446,899 | B2 | 5/2013 | Lei et al. |
| 8,457,145 | B2 | 6/2013 | Zimmerman et al. |
| 8,458,184 | B2 | 6/2013 | Dorogusker et al. |
| D691,636 | S | 10/2013 | Bunton |
| 8,549,638 | B2 | 10/2013 | Aziz |
| 8,553,634 | B2 | 10/2013 | Chun et al. |
| 8,644,301 | B2 | 2/2014 | Tamhankar et al. |
| 8,650,279 | B2 | 2/2014 | Mehta et al. |
| 8,669,902 | B2 | 3/2014 | Pandey et al. |
| 8,676,182 | B2 | 3/2014 | Bell et al. |
| 8,682,279 | B2 | 3/2014 | Rudolf et al. |
| 8,693,367 | B2 | 4/2014 | Chowdhury et al. |
| 8,718,644 | B2 | 5/2014 | Thomas et al. |
| 8,761,174 | B2 | 6/2014 | Jing et al. |
| 8,768,389 | B2 | 7/2014 | Nenner et al. |
| 8,849,283 | B2 | 9/2014 | Rudolf et al. |
| 8,909,698 | B2 | 12/2014 | Parmar et al. |
| 8,958,318 | B1 | 2/2015 | Hastwell et al. |
| 9,060,352 | B2 | 6/2015 | Chan et al. |
| 9,130,859 | B1 | 9/2015 | Knappe |
| 9,173,084 | B1 | 10/2015 | Foskett |
| 9,173,158 | B2 | 10/2015 | Varma |
| D744,464 | S | 12/2015 | Snyder et al. |
| 9,270,709 | B2 | 2/2016 | Shatzkamer et al. |
| 9,271,216 | B2 | 2/2016 | Friman et al. |
| 9,281,955 | B2 | 3/2016 | Moreno et al. |
| D757,424 | S | 5/2016 | Phillips et al. |
| D759,639 | S | 6/2016 | Moon et al. |
| 9,369,387 | B2 | 6/2016 | Filsfils et al. |
| 9,389,992 | B2 | 7/2016 | Gataullin et al. |
| 9,426,305 | B2 | 8/2016 | De Foy et al. |
| D767,548 | S | 9/2016 | Snyder et al. |
| 9,467,918 | B1 | 10/2016 | Kwan |
| D776,634 | S | 1/2017 | Lee et al. |
| 9,544,337 | B2 | 1/2017 | Eswara et al. |
| 9,569,771 | B2 | 2/2017 | Lesavich et al. |
| 9,609,504 | B2 | 3/2017 | Karlqvist et al. |
| 9,615,268 | B2 | 4/2017 | Navarro et al. |
| 9,634,952 | B2 | 4/2017 | Gopinathan et al. |
| 9,642,167 | B1 | 5/2017 | Snyder et al. |
| 9,654,344 | B2 | 5/2017 | Chan et al. |
| 9,712,444 | B1 | 7/2017 | Bolshinsky et al. |
| 9,713,114 | B2 | 7/2017 | Yu |
| 9,736,056 | B2 | 8/2017 | Vasseur et al. |
| 9,762,683 | B2 | 9/2017 | Karampurwala et al. |
| 9,772,927 | B2 | 9/2017 | Gounares et al. |
| 9,820,105 | B2 | 11/2017 | Snyder et al. |
| D804,450 | S | 12/2017 | Speil et al. |
| 9,858,559 | B2 | 1/2018 | Raleigh et al. |
| 9,860,151 | B2 | 1/2018 | Ganichev et al. |
| 9,933,224 | B2 | 2/2018 | Dumitriu et al. |
| 9,923,780 | B2 | 3/2018 | Rao et al. |
| 9,961,560 | B2 | 5/2018 | Farkas et al. |
| 9,967,191 | B2 | 5/2018 | Frost et al. |
| 9,967,906 | B2 | 5/2018 | Verkaik et al. |
| 9,980,220 | B2 | 5/2018 | Snyder et al. |
| 9,985,837 | B2 | 5/2018 | Rao et al. |
| 9,998,368 | B2 | 6/2018 | Chen et al. |
| 2002/0026525 | A1 | 2/2002 | Armitage |
| 2003/0087645 | A1 | 5/2003 | Kim et al. |
| 2003/0116634 | A1 | 6/2003 | Tanaka |
| 2004/0203572 | A1 | 10/2004 | Aerrabotu et al. |
| 2005/0090225 | A1 | 4/2005 | Muehleisen et al. |
| 2005/0147050 | A1 | 7/2005 | Klink |
| 2005/0169193 | A1 | 8/2005 | Black et al. |
| 2005/0186904 | A1 | 8/2005 | Kowalski et al. |
| 2006/0022815 | A1 | 2/2006 | Fischer et al. |
| 2006/0030290 | A1 | 2/2006 | Rudolf et al. |
| 2006/0092964 | A1 | 5/2006 | Park et al. |
| 2006/0126882 | A1 | 6/2006 | Deng et al. |
| 2006/0187866 | A1 | 8/2006 | Werb et al. |
| 2007/0037605 | A1 | 2/2007 | Logan |
| 2007/0239854 | A1 | 10/2007 | Janakiraman et al. |
| 2008/0037715 | A1 | 2/2008 | Prozeniuk et al. |
| 2008/0084888 | A1 | 4/2008 | Yadav et al. |
| 2008/0101381 | A1 | 5/2008 | Sun et al. |
| 2008/0138084 | A1 | 6/2008 | Youn et al. |
| 2008/0163207 | A1 | 7/2008 | Reumann et al. |
| 2008/0233969 | A1 | 9/2008 | Mergen |
| 2009/0129389 | A1 | 5/2009 | Halna DeFretay et al. |
| 2009/0203370 | A1 | 8/2009 | Giles et al. |
| 2009/0282048 | A1 | 11/2009 | Ransom et al. |
| 2009/0298511 | A1 | 12/2009 | Paulson |
| 2009/0307485 | A1 | 12/2009 | Weniger et al. |
| 2010/0039280 | A1 | 2/2010 | Holm et al. |
| 2010/0097969 | A1 | 4/2010 | De Kimpe et al. |
| 2011/0019627 | A1* | 1/2011 | Krishnaswamy ........ H04L 12/14 370/329 |
| 2011/0087799 | A1 | 4/2011 | Padhye et al. |
| 2011/0142053 | A1 | 6/2011 | Van Der Merwe et al. |
| 2011/0182295 | A1 | 7/2011 | Singh et al. |
| 2011/0194553 | A1 | 8/2011 | Sahin et al. |
| 2011/0222412 | A1 | 9/2011 | Kompella |
| 2011/0228779 | A1 | 9/2011 | Goergen |
| 2012/0023552 | A1 | 1/2012 | Brown et al. |
| 2012/0051229 | A1 | 3/2012 | Feldmann et al. |
| 2012/0054367 | A1 | 3/2012 | Ramakrishnan et al. |
| 2012/0088476 | A1 | 4/2012 | Greenfield |
| 2012/0115512 | A1 | 5/2012 | Grainger et al. |
| 2012/0157126 | A1 | 6/2012 | Rekimoto |
| 2012/0167207 | A1 | 6/2012 | Beckley et al. |
| 2012/0182147 | A1 | 7/2012 | Forster |
| 2012/0311127 | A1 | 12/2012 | Kandula et al. |
| 2012/0324035 | A1 | 12/2012 | Cantu et al. |
| 2013/0010600 | A1 | 1/2013 | Jocha et al. |
| 2013/0029685 | A1 | 1/2013 | Moshfeghi |
| 2013/0039391 | A1 | 2/2013 | Skarp |
| 2013/0057435 | A1 | 3/2013 | Kim |
| 2013/0077612 | A1 | 3/2013 | Khorami |
| 2013/0088983 | A1 | 4/2013 | Pragada et al. |
| 2013/0107853 | A1 | 5/2013 | Pettus et al. |
| 2013/0108263 | A1 | 5/2013 | Srinivas et al. |
| 2013/0115916 | A1 | 5/2013 | Herz |
| 2013/0128749 | A1 | 5/2013 | Krzanowski et al. |
| 2013/0145008 | A1 | 6/2013 | Kannan et al. |
| 2013/0155906 | A1 | 6/2013 | Nachum et al. |
| 2013/0191567 | A1 | 7/2013 | Rofougaran et al. |
| 2013/0203445 | A1 | 8/2013 | Grainger et al. |
| 2013/0217332 | A1 | 8/2013 | Altman et al. |
| 2013/0232433 | A1 | 9/2013 | Krajec et al. |
| 2013/0273938 | A1 | 10/2013 | Ng et al. |
| 2013/0317944 | A1 | 11/2013 | Huang et al. |
| 2013/0322438 | A1 | 12/2013 | Gospodarek et al. |
| 2013/0343198 | A1 | 12/2013 | Chhabra et al. |
| 2013/0347103 | A1 | 12/2013 | Veteikis et al. |
| 2014/0007089 | A1 | 1/2014 | Bosch et al. |
| 2014/0016926 | A1 | 1/2014 | Soto et al. |
| 2014/0025770 | A1 | 1/2014 | Warfield et al. |
| 2014/0052508 | A1 | 2/2014 | Pandey et al. |
| 2014/0059655 | A1 | 2/2014 | Beckley et al. |
| 2014/0086253 | A1 | 3/2014 | Yong |
| 2014/0087693 | A1 | 3/2014 | Walby et al. |
| 2014/0105213 | A1 | 4/2014 | A K et al. |
| 2014/0118113 | A1 | 5/2014 | Kaushik et al. |
| 2014/0148196 | A1 | 5/2014 | Bassan-Eskenazi et al. |
| 2014/0177638 | A1 | 6/2014 | Bragg et al. |
| 2014/0179352 | A1 | 6/2014 | V.M. et al. |
| 2014/0191868 | A1 | 7/2014 | Ortiz et al. |
| 2014/0198808 | A1 | 7/2014 | Zhou |
| 2014/0222997 | A1 | 8/2014 | Mermoud et al. |
| 2014/0233460 | A1 | 8/2014 | Pettus et al. |
| 2014/0269321 | A1 | 9/2014 | Kamble et al. |
| 2014/0280834 | A1 | 9/2014 | Medved et al. |
| 2014/0302869 | A1 | 10/2014 | Rosenbaum et al. |
| 2014/0337824 | A1 | 11/2014 | St. John et al. |
| 2014/0341568 | A1 | 11/2014 | Zhang et al. |
| 2015/0011182 | A1* | 1/2015 | Goldner ................ H04M 15/66 455/406 |
| 2015/0016245 | A1 | 1/2015 | Ra et al. |
| 2015/0016286 | A1 | 1/2015 | Ganichev et al. |
| 2015/0016469 | A1 | 1/2015 | Ganichev et al. |

(56) References Cited

U.S. PATENT DOCUMENTS

| | | |
|---|---|---|
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326469 A1 | 11/2015 | Kern et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2015/0365288 A1 | 12/2015 | Van Der Merwe et al. |
| 2016/0007315 A1 | 1/2016 | Lundgreen et al. |
| 2016/0021597 A1 | 1/2016 | Hart et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0104660 A1 | 4/2017 | Wexler et al. |
| 2017/0111209 A1 | 4/2017 | Ward et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0250907 A1 | 8/2017 | Pignataro et al. |
| 2017/0317997 A1 | 11/2017 | Smith et al. |
| 2017/0324622 A1 | 11/2017 | Ubaldi et al. |
| 2017/0324651 A1 | 11/2017 | Penno et al. |
| 2017/0332421 A1 | 11/2017 | Sternberg et al. |
| 2017/0339706 A1 | 11/2017 | Andreoli-Fang et al. |
| 2017/0366456 A1 | 12/2017 | Dara et al. |
| 2018/0013669 A1 | 1/2018 | Bardhan et al. |
| 2018/0062991 A1 | 3/2018 | Nainar et al. |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0176134 A1 | 6/2018 | Pignataro et al. |
| 2018/0278510 A1 | 9/2018 | Iqbal et al. |
| 2018/0278548 A1 | 9/2018 | Pignataro et al. |

FOREIGN PATENT DOCUMENTS

| | | |
|---|---|---|
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

Afolabi et al., "Network Slicing & Softwarization: A Survey on Principles, Enabling Technologies & Solutions," mosaic-lab.org, pp. 1-24.

"I Love WiFi, the difference between L2 and L3 Roaming Events," Apr. 1, 2010, 6 pages.

Antonioli, Roberto, et al., "Dual Connectivity for LTE-NR Cellular Networks," Research Gate, Sep. 3-6, 2017, pp. 171-175.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cisco ASR 5x00 Mobility Management Entity Administration Guide, Version 15.0, Last updated Jun. 13, 2014, Cisco, 1-266.

Cisco Systems, Inc., "Wi-FI Location-Based Services 4.1 Design Guide," May 20, 2008, 206 pages.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012 ), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Network Heresy, "NVGRE, VXLAN and What Microsoft is Doing Right," Oct. 3, 2011, 5 pages.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

"Cisco ASR 5x00 Mobility Management Entity Administration Guide," Version 15.0, Cisco Systems, Inc., Last updated Jun. 13, 2014, pp. 1-266.

"Quality of Service Regulation Manual," ITU 2017, pp. 1-174.

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

(56) References Cited

OTHER PUBLICATIONS

Cheng, W., et al., "Path Segment in MPLS Based Sement Routing Network," Network Working Group, Oct. 2017, pp. 1-10.
Christidis, Konstantinos, et al., "Blockchains and Smart Contracts for the Internet of Things," IEEE Access, Special Section on the of Research in Internet of Things (IoT), vol. 4, May 10, 2016, pp. 1-12.
de Sousa, Nathan F. Saraiva, et al., "Network Service Orchestration: A Survey," IEEE Communications Surveys & Tutorials, Mar. 23, 2018, pp. 1-30.
Doyle, Matthew G., "An IP Address Management Solution for a Server Solution Provider," A Dissertation Submitted to The University of Liverpool, Sep. 28, 2005, 116 pages.
Herb, Daniel, et al., "ROAUM: How to Unblock ROAMING IoT Using BLockchain," https://uploads-ssl.webflow.com/5987a08baeea4300016b7bd9/5a7a6d6cee5bc400010a08f2_Roaum_Roaming-IoT_Whitepaper.pdf, pp. 1-14.
Hsieh, Cynthia, "Location Awareness in VMware View 4.5 and Above," VMware, 2011, 8 pages.
Husain, Syed, et al., "Mobile Edge Computing with Network Resource Slicing for Internet-of-Things," IEEE 2017, pp. 1-7.
Jero, Samuel, et al., "Identifier Binding Attacks and Defenses in Software-Defined Networks," USENIX, The Advanced Computing Systems Association, Aug. 16-18, 2017, 19 pages.
Leonhardt, Ulf, "Supporting Location-Awareness in Open Distributed Systems," May 1998, 186 pages.
Morozov, Yury, "Blockchain Telecom: Bubbletone Blockchain," Dec. 29, 2017, pp. 1-33.
Norwegian National Security Authority, "N-03 Security guidance for switches and routers," Sep. 26, 2012, pp. 1-24.
Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.
Sun, et al., "The future of Wi-Fi," IEEE Communications Magazine, vol. 52, No. 11, Nov. 21, 2014, 166 pages.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

\* cited by examiner

SYSTEM AND METHOD FOR SHARING SUBSCRIBER RESOURCES IN A NETWORK ENVIRONMENT

TECHNICAL FIELD

The present technology pertains to management of subscriber resources in a network environment. More particularly, the technology pertains to subscriber Quality of Service (QoS) management in a 5G mobile network environment.

BACKGROUND

When a user device executes an application over a network, a dedicated bearer is established for transmitting the application data over the network. In other words, the dedicated bearer is a dedicated data pipeline between network nodes for relaying application data and the like. The dedicated bearer is established under predetermined parameters which are associated with the user device through a subscriber account. The predetermined parameters include QoS attributes and the like. Applications increasingly rely on varying levels of connection quality. For example, an email application may require only a minimal bitrate and the like, whereas a virtual reality (VR) application may require a substantially higher QoS. Oftentimes, applications are used intermittently and a single QoS may be unnecessary for one application and insufficient for another. Further, an increased QoS may only be needed for a short period of time, after which a lower QoS may be sufficient for other applications executed on the user device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

A network service modification, sponsored by a sponsoring member, may be requested by a requesting member and the request may include an identification of a sponsoring member. A group may be generated and can include the requesting member and sponsoring member, as well as a group policy which has a reference to the sponsored network service modification. Further, the sponsoring member may be provided with an activation key which can be used to activate the sponsored network service modification. The group policy may then be used to apply a first network policy to the requesting member and also a second network policy to the sponsoring member.

Example Embodiments

When a user device makes a connection over a public data network (PDN), a default bearer is established for carrying data over the connection. A default bearer may typically be associated with a particular aggregate maximum bit rate value for the access point name, or APN-AMBR value, which may determine various aspects of service over the connection (e.g., QoS, speed, bandwidth, and the like). The service aspects may, in some examples, operate within a range without providing a guaranteed rating and the like.

When the user device executes, for example, an application while connected over the PDN, the application may require a guaranteed bit rate (GBR) and/or other QoS attributes such as, without limitation, maximum bit rate (MBR), packet delay, error level, QoS class identifier (QCI), and the like. In some cases, the application may require QoS parameters that exceed the QoS associated with the subscription level for the user device. In such cases, the user device may be unable to execute the application or the user experience with the application may be poor.

In one particular embodiment, a user who is a network member can provide a request for a sponsored network service modification, such as an alteration of QoS associated with the member account and the like, and identify another network member as a sponsor. As a result, a group may be generated for associating the requesting member and the sponsoring member as well as the requested service modification. The sponsoring member may then receive an activation key for the service modification which, when used, may cause network policies (e.g., QoS and the like) for the requesting member and the sponsoring member to be modified. For example, the requesting member may receive an increase in QoS whereas the sponsoring member may receive a proportionally equivalent decrease in QoS. Further, in some examples, the modification can be applied for a timed duration, after which it may be reverted so that the requesting member and the sponsoring member return to their respective original QoS.

While a user device is connected to a PDN, a dedicated bearer may be established in response to an application being executed on the device and requiring a dedicated data connection. For example, when a Voice over Internet Protocol (VoIP) application initiates a call session, a dedicated bearer may be utilized to ensure a consistent and stable connection. The dedicated bearer may be assigned, for example, a GBR or other QoS attributes based on the policies related to an account owner associated with the user device. The policies may be defined by, for example, a subscription plan of the account owner and the like.

Where the policies related to the account owner are insufficient to assign adequate characteristics to the dedicated bearer—for example, a low cost subscription may be associated with a fairly poor QoS—the account owner can change a subscription plan for the user device. However, updating the subscription plan may take time, increase expense, or be otherwise infeasible in a given context.

In some embodiments, an account owner, or requesting member, may request QoS and the like from another account owner, or sponsoring member, in order to facilitate adequate dedicated bearers for applications and the like executed on the respective user device. Upon agreement by the sponsoring member, QoS for the requesting member account may be increased and a proportionate reduction in QoS may be applied to the account of the sponsoring member.

In some examples, the account modifications can be processed by an Unstructured Supplementary Service Data function (USSD). In some other examples, the account modifications may be processed by a Network Exposure Function (NEF).

Further, in one embodiment, a sponsor group may be created. The sponsor group provides for multiple different account holders to serve as sponsoring members. In some examples, each sponsoring member within the sponsor group can contribute an equal amount of QoS to the requesting member. In other examples, various allocation schemes can be included with a request or with the agreement to sponsor provided by respective sponsoring members.

In one embodiment, a duration or other time component can be associated with the modifications to QoS and the like. In one example, once the duration has expired, the QoS modifications can revert to their respective original pre-modification states. In some other examples, the time component may include a scheduler or time tracker wherein a total use time and the like can be tracked so that the requesting member can use the modified service for a time, cease using it, and then return to using it until a certain amount of total time has been used.

Figure 1:
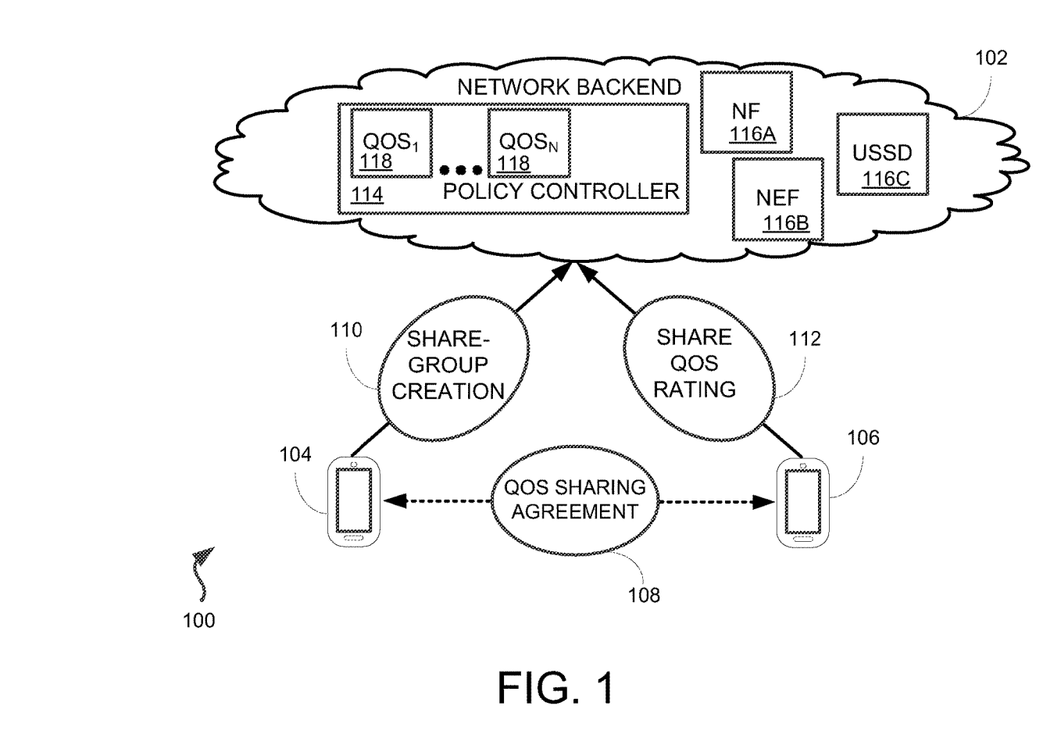
FIG. 1 illustrates an example operating environment.

FIG. 1 illustrates a mobile network environment 100 in which QoS can be shared between account members. In particular, account members are able to enter into groups of sponsors and a requestor. The groups may be managed at a layer of the network that is generally obfuscated to network members. In other words, the groups may be managed "under the hood" with members only providing a request and agreements to the request.

A requesting member device 104 and a sponsoring member device 106 can generate a QoS sharing agreement 108 between them. The QoS sharing agreement 108 can include further details such as QoS attributes like bit rate, bandwidth, and the like. A time duration and the like for the sponsored QoS can also be included in the QoS sharing agreement 108.

The requesting member device 104 can also transmit a share-group creation request 110 to network backend 102. In some examples, the share-group creation request 110 can include identification of the sponsoring member device 106. In other examples, the share-group creation request 110 may include an open ended component and the like in order to allow for adding new sponsor members on the fly.

Sponsoring member device 106 can transmit a request 112 for sharing QoS rating or other service attribute to be modified within the group. Network backend 102 receives requests 110 and 112 from respective devices 104 and 106. Network service backend 102 may include various services and functions such as, without limitation, network function (NF) 116A, network exposure function (NEF) 116B, and unstructured supplementary service data (USSD) 116C.

Further, in one embodiment, network backend 102 may include policy controller 114 (e.g., a policy control function (PCF)). Policy controller 114 can maintain any number of policies 118 which can include QoS ratings and the like.

Figure 2:
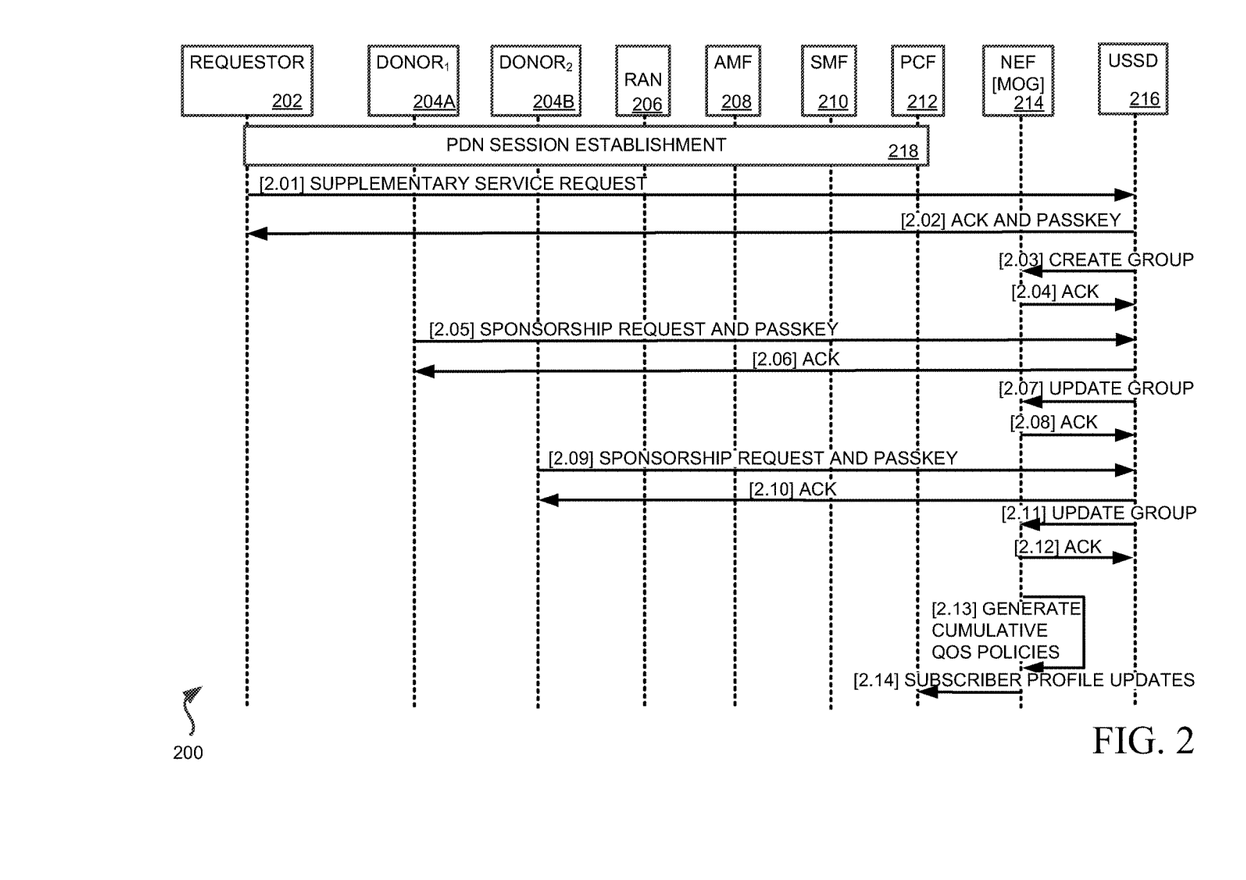
FIG. 2 depicts an example call sequence.

FIG. 2 depicts a call sequence 200 for sharing QoS between multiple user devices on a network. In particular, messages can be passed between a requestor 202, donors 204A and 204B, radio access network (RAN) 206, access and mobility management function (AMF) 208, session management function (SMF) 210, policy control function (PCF) 212, NEF (such as, for example, a mobility orchestration gateway (MOG) and the like) 214, and unstructured supplementary service data (USSD) 216. Further, while NEF 214 and USSD 216 are depicted in FIG. 2 as distinct message recipients, some embodiments include network configurations in which NEF 214 may provide the functionality of USSD 216 and thus the messages of call sequence 200 which are directed to USSD 216 may instead be directed to NEF 214.

A packet data network (PDN) session for requestor 202 may be first established via a PDN session establishment sequence 218. In some examples, PDN session establishment sequence 218 can include various messages being passed between requestor 202, RAN 206, AMF 208, SMF 210, and PCF 212 as will be understood by a person having ordinary skill in the art. Further, donors 204A-B may also establish PDN sessions via one or more PDN session establishment sequences 218 and the like.

Having established respective PDN sessions for requestor 202 and donors 204A-B, requestor 202 can transmit to USSD 216 a message 2.01 including a supplementary service request in order to create a group for sponsoring increased QoS rates and the like for requestor 202. In response, USSD 216 may transmit to requestor 202 a message 2.02 including an acknowledgement and passkey. Requestor 202 may then provide the received passkey to donors 204A-B. Further, USSD 216 can transmit to NEF 214 a group creation request message 2.03 and NEF 214 may transmit back to USSD 216 an acknowledgement message 2.04. As a result, NEF 214 and USSD 216 will have a record of the created group.

Donor 204A can transmit to USSD 216 a message 2.05 including a sponsorship request and the passkey received by requestor 202 in message 2.02. The sponsorship request message can include further information identifying the group created by USSD 216 via message 2.03. In some examples, the passkey may serve as both group identifier and access code.

USSD 216 may transmit back to donor 204A an acknowledgement message 2.06 and then proceed to transmit to NEF 214 an update message 2.07 for adding donor 204A to the group. NEF 214 can then reciprocate by transmitting an acknowledgement message 2.04 back to USSD 216.

In one embodiment, multiple sponsors may join the group and a donor 204B may participate in a similar call sequence as that above. In particular, donor 204B can transmit to USSD 216 a message 2.09 including a sponsorship request and the passkey, which USSD 216 may respond to by transmitting back to donor 204B an acknowledgement message 2.10. USSD 216 can then transmit to NEF 214 an update message 2.11 for the appropriate group and may receive back from NEF 214 an acknowledgement message 2.12.

NEF 214 may generate cumulative QoS policies by sending a message 2.13 to itself. For example, where donors 204A-B contribute equal portions of QoS rating to requestor 202, the QoS for each of donors 204A-B may be proportionately reduced whereas the QoS rating for requestor 202 may be increased by a sum total of the reductions of the donor 204A-B QoS ratings. The updated policies may be used to provide subscriber profile updates to PCF 212 via message 2.14 from NEF 214 to PCF 212.

Using the provided subscriber profile updates, PCF 212 may update respective QoS rules via message 2.15 sent to itself. SMF 210 can then be notified of the updates by receiving a message 2.16 from PCF 212. Further, SMF 210 can transmit to requestor 202 a message 2.17 to provide it with notifications of bearer QoS modifications (e.g., increased QoS for a dedicated bearer enabling, for example, VoIP service and the like).

In one embodiment, NEF 214 can maintain an internal limitation on the QoS modifications in order to reset the QoS policies by sending message 2.18 to itself. For example, NEF 214 may track time and only allow QoS modifications to exist for a certain duration, or NEF 214 may track total data usage and thus reset the QoS modifications once requestor 202 has utilized a certain amount of data at the modified QoS level, or other such variations as will be apparent to a person having ordinary skill in the art. Accordingly, NEF 214 may transmit to PCF 212 a message 2.19 to update the respective QoS profile (e.g., resetting each back to a pre-modification level). PCF 212 can then transmit a message 2.20 to SMF 210 in order to notify SMF 210 of the modifications (e.g., reset policies and the like).

Figure 3:
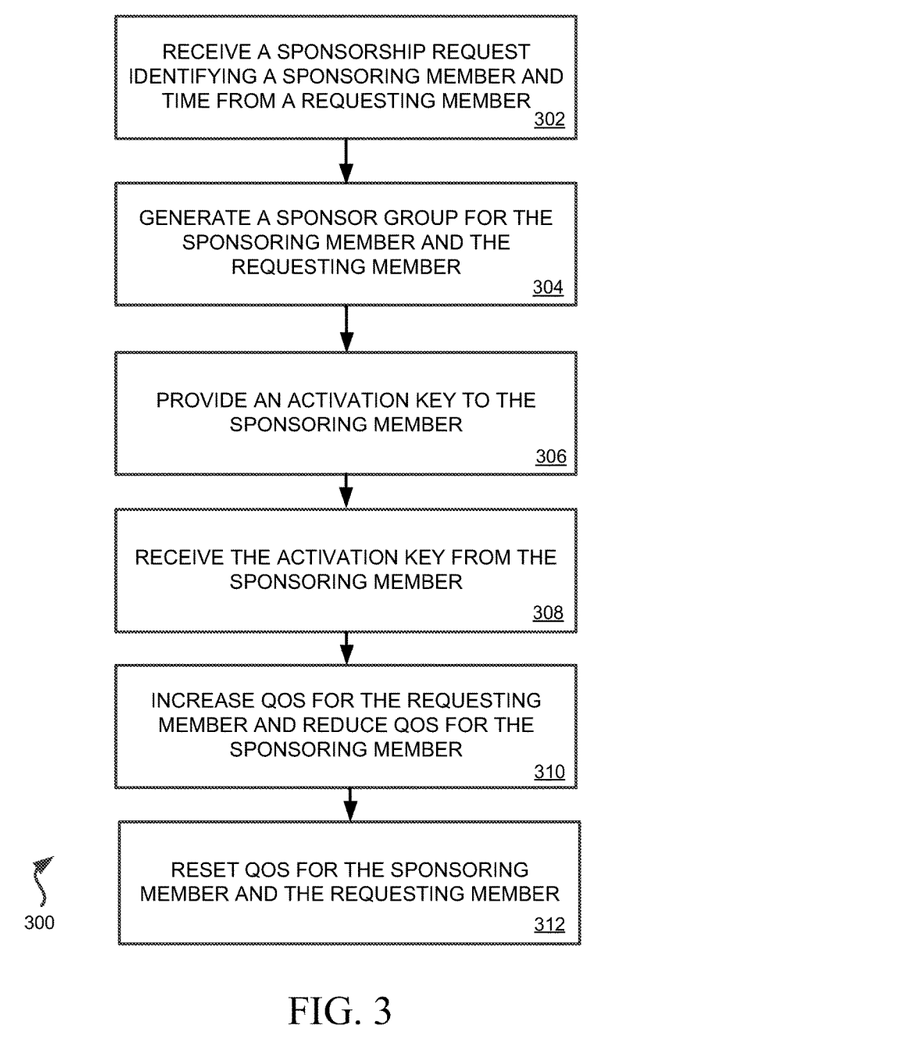
FIG. 3 is a flowchart depicting an example method.

FIG. 3 depicts a method 300 for enabling users to sponsor QoS modifications and the like for other users within a group. For example, rather than requiring a user to modify a respective subscription plan, the user may create a sponsor group for receiving QoS parameter improvements from other users. The user may then provide the other users with a key to join the sponsorship group and through it provide improved QoS parameters to the user.

A sponsorship request may first be received by, for example, NEF 116B (operation 302). In one embodiment, the request may be provided by a requesting member via, for example, user device 104 and the like. Further, the sponsorship request may identify a sponsoring member and time duration.

A sponsor group can be generated and associated with the sponsoring member and the requesting member (operation 304). In one embodiment, the sponsor group can be generated by NEF 116B. In another embodiment, the sponsor group can be provided to NEF 116B by, for example, USSD 116C and the like.

The sponsoring member may then receive an activation key (operation 306). In one embodiment, the activation key may be provided first to the requesting member who can then provide the key to one or more sponsoring members over, for example, email, text message, and the like as will be apparent to a person having ordinary skill in the art. In another embodiment, the sponsoring member may automatically receive the activation key based on the identification of the sponsoring member included in the sponsorship request.

The sponsoring member can provide the activation key to, for example, NEF 116B via user device 106 (operation 308). In response, QoS for the requesting member can be increased and QoS for the sponsoring member can be decreased in proportion to the increase of QoS (operation 310). In one embodiment, modifications to QoS can be performed for every member of the sponsor group. Further, in some examples, the sponsor group can include other information used for the modifications to QoS such as, for example and without imputing limitation, a time based on the time included in the sponsorship request and the like.

In one embodiment, when an amount of time equal to the time included in the sponsorship request has passed, QoS for the sponsoring member and the requesting member may be respectively reset (operation 312).

Figure 4:
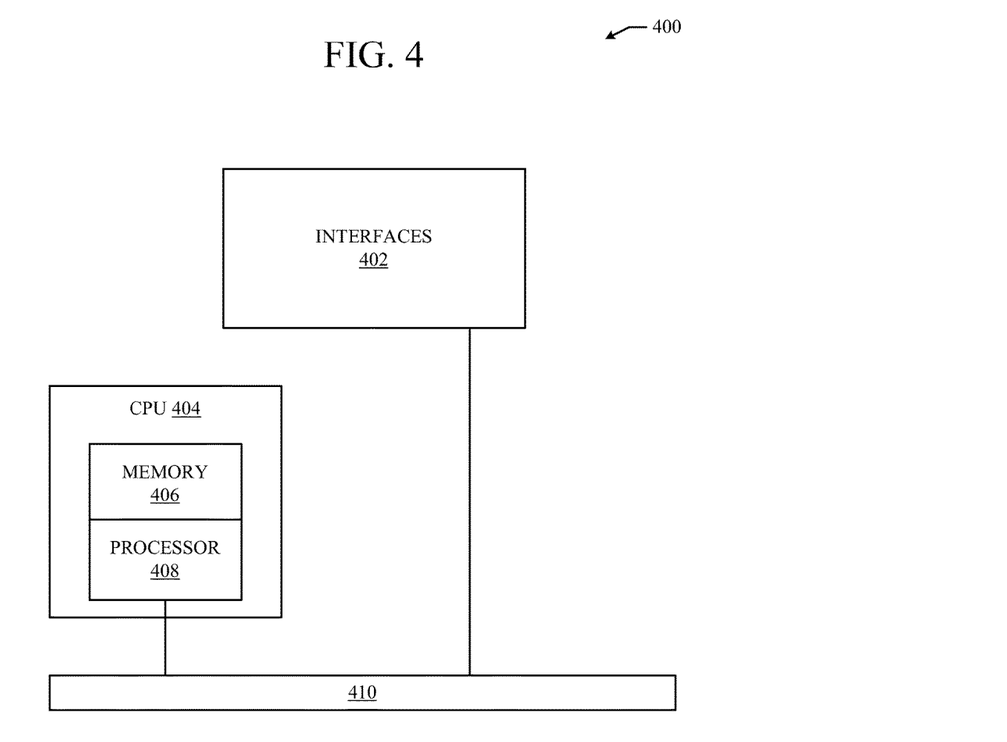
FIG. 4 illustrates an example computing device.

Although the system shown in FIG. 4 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 406 could also hold various software containers and virtualized execution environments and data.

The network device 400 can also include an application-specific integrated circuit (ASIC), which can be configured to perform routing, switching, and/or other operations. The ASIC can communicate with other components in the network device 400 via the connection 410, to exchange data and signals and coordinate various types of operations by the network device 400, such as routing, switching, and/or data storage operations, for example.

Figure 5:
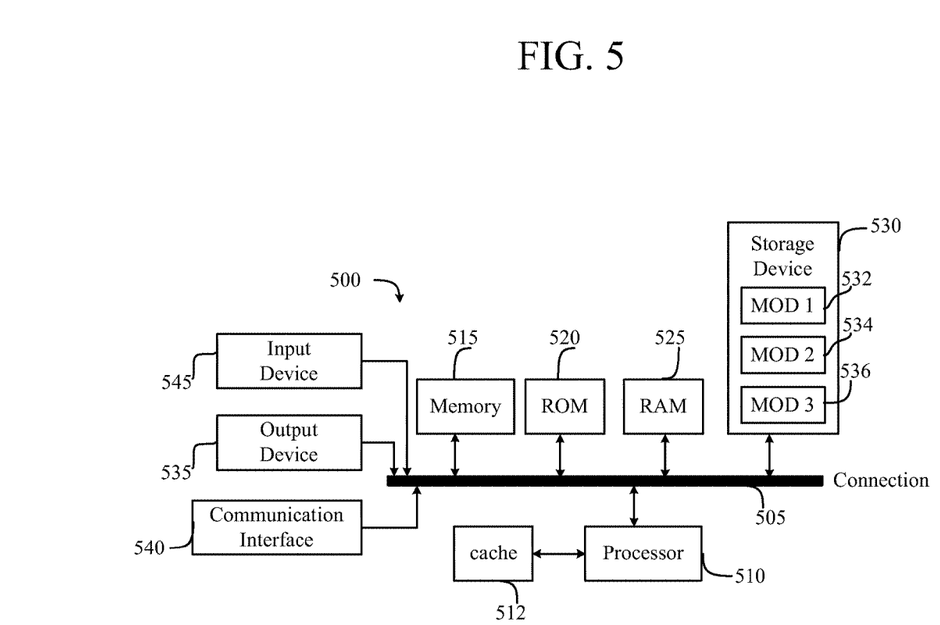
FIG. 5 illustrates an example computing device.

FIG. 5 illustrates a computing system architecture 500 including components in electrical communication with each other using a connection 505, such as a bus. System 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
receiving, by a processor and from a requesting member, a request for a sponsored network service modification, the request including an identification of a sponsoring member for the sponsored network service modification and a time duration for the sponsored network service modification;
generating, by the processor, a group associated with the sponsoring member and the requesting member, the group including a group policy comprising a reference to the sponsored network service modification and the time duration;
providing, to the sponsoring member, a key for activating the sponsored network service modification;
receiving, by the processor and from the sponsoring member, the key for activating the sponsored network service modification;
modifying, by the processor and according to the group policy, a first network policy applied to the requesting member and a second network policy applied to the sponsoring member, the modification of the first network policy including an increase in a Quality of Service (QoS) to the requesting member and the modification to the second network policy including a decrease in a QoS to the sponsoring member; and
reverting the modification to the first network policy and the second network policy in response to the time duration completing.

2. The method of the claim 1, wherein the request is received by an unstructured supplementary service data server (USSD), the method further comprising:
transmitting, by the USSD and to a network exposure function (NEF), the received request; and
storing, by the processor and in the NEF, the group for a time duration, the NEF in communication with a policy control function (PCF) for modifying the first network policy and the second network policy.

3. The method of claim 1, wherein the request is received by a NEF, the method further comprising storing, by the processor and in the NEF, the group for a time duration, the NEF in communication with a PCF for modifying the first network policy and the second network policy.

4. The method of claim 1, wherein the request adheres to a representative state transfer (REST) format.

5. The method of claim 1, wherein the request includes a second sponsoring member and the group is further associated with the second sponsoring member, the method further comprising:
providing, to the second sponsoring member, the key for activating the sponsored network service modification; and
modifying, by the processor and according to the group policy, a third network policy applied to the second sponsoring member.

6. A system comprising:
a processor; and
a memory storing instructions which, when executed, cause the processor to:
receive, from a requesting member, a request for a sponsored network service modification, the request including an identification of a sponsoring member for the sponsored network service modification and a time duration for the sponsored network service modification;
generate a group associated with the sponsoring member and the requesting member, the group including a group policy comprising a reference to the sponsored network service modification and the time duration;
provide, to the sponsoring member, a key for activating the sponsored network service modification;
receive, from the sponsoring member, the key for activating the sponsored network service modification;
modify, according to the group policy, a first network policy applied to the requesting member and a second network policy applied to the sponsoring member, the modification of the first network policy including an increase in a Quality of Service (QoS) to the requesting member and the modification to the second network policy including a decrease in a QoS to the sponsoring member; and
reverting the modification to the first network policy and the second network policy in response to the time duration completing.

7. The system of claim 6, further comprising an unstructured supplementary service data server (USSD), wherein the request is received by the USSD and the memory further stores instructions which, when executed, cause the processor to:
transmit, from the USSD and to a network exposure function (NEF), the received request; and
store, in the NEF, the group for the time duration, the NEF in communication with a policy control function (PCF) for modifying the first network policy and the second network policy.

8. The system of claim 6, wherein the request is received by a NEF and the memory further stores instructions which, when executed, cause the processor to:
store, in the NEF, the group for the time duration, the NEF in communication with a PCF for modifying the first network policy and the second network policy.

9. The system of claim 6, wherein the request adheres to a representative state transfer (REST) format.

10. The system of claim 6, wherein the request includes a second sponsoring member and the group is further associated with the second sponsoring member, and the memory further stores instructions which, when executed, cause the processor to:
provide, to the second sponsoring member, the key for activating the sponsored service modification; and
modify, according to the group policy, a third network policy applied to the second sponsoring member;
wherein the modification to the third network policy is reversed in response to the time duration completing.

11. A non-transitory computer-readable medium comprising instructions stored thereon, which, when executed by one or more processors, cause the one or more processors to:
receive, from a requesting member, a request for a sponsored network service modification, the request including an identification of a sponsoring member for the sponsored network service modification and a time duration for the sponsored network service modification;
generate a group associated with the sponsoring member and the requesting member, the group including a group policy comprising a reference to the sponsored network service modification and the time duration;

provide, to the sponsoring member, a key for activating the sponsored network service modification;

receive, from the sponsoring member, the key for activating the sponsored network service modification;

modify, according to the group policy, a first network policy applied to the requesting member and a second network policy applied to the sponsoring member, the modification of the first network policy including an increase in a Quality of Service (QoS) to the requesting member and the modification to the second network policy including a decrease in a QoS to the sponsoring member; and reverting the modification to the first network policy and the second network policy in response to the time duration completing.

12. The non-transitory computer-readable medium of claim 11, wherein the request is received by an unstructured supplementary service data server (USSD), and further comprising instructions effective to cause a communications network to:

transmit, from the USSD and to a network exposure function (NEF), the received request; and store, in the NEF, the group for the time duration, the NEF in communication with a policy control function (PCF) for modifying the first network policy and the second network policy.

13. The non-transitory computer-readable medium of claim 11, wherein the request is received by a NEF, and further comprising instructions effective to cause a communications network to:

store, in the NEF, the group for the time duration, the NEF in communication with a PCF for modifying the first network policy and the second network policy.

14. The non-transitory computer-readable medium of claim 11, wherein the request adheres to a representative state transfer (REST) format.

15. The non-transitory computer-readable medium of claim 11, wherein the request includes a second sponsoring member and the group is further associated with the second sponsoring member, and further comprising:

provide, to the second sponsoring member, the key for activating the sponsored service modification; and modify, according to the group policy, a third network policy applied to the second sponsoring member;

wherein the modification to the third network policy is reversed in response to the time duration completing.

* * * * *